United States Patent
Dolgin et al.

(10) Patent No.: US 11,201,677 B1
(45) Date of Patent: Dec. 14, 2021

(54) HARD-TO-INTERCEPT MULTIPLE COHERENT TRANSMITTER COMMUNICATIONS

(71) Applicant: Raytheon Company, Waltham, MA (US)

(72) Inventors: Benjamin P. Dolgin, Alexandria, VA (US); Andrew M. Kowalevicz, Arlington, VA (US); Gary M. Graceffo, Burke, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/896,022

(22) Filed: Jun. 8, 2020

(51) Int. Cl.
- *H04B 10/50* (2013.01)
- *H04B 10/556* (2013.01)
- *H04B 10/54* (2013.01)

(52) U.S. Cl.
CPC ......... *H04B 10/505* (2013.01); *H04B 10/541* (2013.01); *H04B 10/5561* (2013.01)

(58) Field of Classification Search
CPC .......................... H04B 10/505; H04B 10/5053
See application file for complete search history.

(56) References Cited

U.S. PATENT DOCUMENTS

| | | |
|---|---|---|
| 3,936,603 A | 2/1976 | Guppy et al. |
| 5,581,575 A | 12/1996 | Zehavi et al. |
| 5,796,757 A | 8/1998 | Czaja |
| 5,940,196 A * | 8/1999 | Piehler ............... H04B 10/50 398/66 |
| 5,952,936 A | 9/1999 | Enomoto |
| 8,111,402 B2 | 2/2012 | Le et al. |
| 8,295,712 B2 | 10/2012 | Chen et al. |
| 8,411,351 B2 | 4/2013 | McCallion et al. |
| 8,693,875 B2 | 4/2014 | Banwell et al. |
| 9,755,674 B2 | 9/2017 | Graceffo et al. |
| 9,900,031 B2 | 2/2018 | Kowalevicz et al. |
| 9,973,281 B2 | 5/2018 | Kowalevicz et al. |
| 9,989,989 B2 | 6/2018 | Kowalevicz |
| 10,164,765 B2 | 12/2018 | Dolgin et al. |
| 10,313,022 B2 | 6/2019 | Dolgin et al. |
| 2006/0013591 A1 | 1/2006 | Rohde |
| 2007/0031150 A1 | 2/2007 | Fisher et al. |

(Continued)

FOREIGN PATENT DOCUMENTS

JP          H0591047 A          4/1993

OTHER PUBLICATIONS

Ehteshami et al., "Optically Tunable Single Passband Microwave Photonic Filter Based on Phase-Modulation to Intensity-Modulation Conversion in a Silicon-on-Insulator Microring Resonator", International Topical Meeting of Microwave Photonics, Oct. 2015, 4 pages.

(Continued)

*Primary Examiner* — Shi K Li (57) ABSTRACT

An optical transmitter (and methods of transmitting and receiving) includes a delay and modulation circuit (or communications circuit) configured to receive at least one optical beam and a data signal and generate at least two or more modulated optical beams having the data encoded therein. One of the modulated optical beams is a time-delayed or time-shifted version of another one of the modulated optical beams, and both beams are directed toward a target.

20 Claims, 5 Drawing Sheets

(56) References Cited

U.S. PATENT DOCUMENTS

| | | |
|---|---|---|
| 2008/0034866 A1 | 2/2008 | Kilic et al. |
| 2008/0074736 A1 | 3/2008 | Kuo et al. |
| 2008/0226300 A1 | 9/2008 | Mayer et al. |
| 2008/0240736 A1 | 10/2008 | Ji et al. |
| 2008/0266573 A1 | 10/2008 | Choi et al. |
| 2010/0196016 A1* | 8/2010 | Zhang ............... H04B 10/5561 398/152 |
| 2011/0097085 A1 | 4/2011 | Oda et al. |
| 2012/0121271 A1 | 5/2012 | Wood |
| 2012/0269523 A1 | 10/2012 | McCallion et al. |
| 2013/0272337 A1 | 10/2013 | Tan et al. |
| 2013/0327145 A1 | 12/2013 | Walker et al. |
| 2014/0314406 A1 | 10/2014 | Zerbe et al. |
| 2015/0160257 A1 | 6/2015 | Bulatowicz |
| 2015/0318982 A1 | 11/2015 | Kowalevicz et al. |
| 2015/0319061 A1 | 11/2015 | Kowalevicz |
| 2016/0013870 A1 | 1/2016 | Sorin et al. |
| 2018/0054259 A1 | 2/2018 | Kowalevicz et al. |
| 2018/0091227 A1 | 3/2018 | Dolgin et al. |
| 2018/0091228 A1 | 3/2018 | Kowalevicz et al. |
| 2018/0091230 A1* | 3/2018 | Dolgin ................ H04B 10/671 |
| 2018/0102853 A1 | 4/2018 | Dolgin et al. |
| 2018/0145764 A1 | 5/2018 | Dolgin et al. |
| 2018/0145765 A1 | 5/2018 | Kowalevicz et al. |
| 2018/0167145 A1 | 6/2018 | Dolgin et al. |
| 2018/0205463 A1 | 7/2018 | Karpov et al. |
| 2019/0007091 A1* | 1/2019 | Graceffo ................ H04B 10/54 |

OTHER PUBLICATIONS

Arimoto et al., "High-speed free-space laser communication", Performance and Management of Complex Communication Networks, 1998, pp. 175-190.

Wright et al., "Adaptive optics correction into single mode fiber for a low Earth orbiting space to ground optical communication link using the OPALs downlink", Optics Express, vol. 23, Dec. 2015, 8 pages.

Andrews et al., "Final Report: Channel Characterization for Free-Space Optical Communications," Jul. 2012, 60 pages.

Juarez et al., "High-sensitivity DPSK receiver for high-bandwidth free-space optical communication links", Optics Express, vol. 19, May 2011, 8 pages.

Zhang et al. "Microring-based Modulation and Demodulation of DPSK Signal", Optical Society of America, Optics Express, vol. 15, No. 18, Sep. 2007, 6 pages.

Fang et al., "Multi-channel Silicon Photonic Receiver Based on Ring-resonators", Optics Express, vol. 18, No. 13, Jun. 2010, 6 pages.

Xu et al., "Optical Differential-Phase-Shift-Keying Demodulation Using a Silicon Microring Resonator", IEEE Photonics Technology Letters, vol. 21, No. 5, Mar. 2009, 3 pages.

* cited by examiner

HARD-TO-INTERCEPT MULTIPLE COHERENT TRANSMITTER COMMUNICATIONS

TECHNICAL FIELD

This disclosure is generally directed to laser communication systems. More specifically, this disclosure is directed to transmission of communications using an optical transmitter having multiple coherent lasers.

BACKGROUND

Light waves may be made to carry information by modulating a light source, such as a laser source, to change one or more of the various properties of the light, such as amplitude, phase, frequency, or wavelength. These light waves may be in the visible spectral band, the infrared spectral band, or another region of the electromagnetic spectrum. An optical receiver receives the light waves and measures one or more properties or variations of the light waves, such as amplitude, phase transitions, and the like, from which the information may be recovered.

Conventional optical receivers for line-of-sight communications using modulated light waves (such as modulated laser beams) are configured to collect signals from a large area so that the acquired signal power allows for accurate detection. Various optics enable the capture and focus of light waves to concentrate the signal power at a detector in the receiver. For some modulation schemes, such as phase modulation, conventional receivers require coherent light, so a laser is often used as the light source. When such light is collected and focused, the best reception occurs if all the light rays (across the cross-section of a telescope) arrive at the detector in unison as a single wavefront, maintaining alignment of the original phase relationships of the light rays. When light rays have propagated through different media along the way or are skewed, delayed, aberrated, or otherwise affected as is typical for light waves traveling some distance through the atmosphere, free space, or any other media, the light rays tend to erode and ultimately destroy the coherency of the optical signal. Without some form of wavefront correction in such systems, it is difficult or impossible for conventional receivers to accurately demodulate an incoming optical signal.

SUMMARY

This disclosure is directed to an optical/laser communication system having multiple coherent laser transmitters, each of which transmits the same data signal to the same target.

In a first embodiment, an optical transmitter includes an optical laser source configured to output at least one optical beam. A delay and modulation circuit (or communications circuit or circuitry) is configured to receive first data, receive the at least one optical beam, and transmit, using the at least one optical beam, a first modulated optical beam encoded with the first data in accordance with a predetermined phase modulation scheme. The delay and modulation circuit is also configured to transmit, using the at least one optical beam, a second modulated optical beam encoded with the first data in accordance with the predetermined phase modulation scheme, wherein the second modulated optical beam is a time-delayed version of the first modulated optical beam.

In a further embodiment, the optical transmitter also includes one or more phase or time delay elements configured to inject a delay into an electrical path or optical path within the transmitter resulting in the second modulated optical beam to being delayed or time-shifted with respect to the first modulated optical beam. In some embodiments, the first delay amount is an amount less than a symbol length of symbols transmitted within the second optical beam. Also, in some embodiments, the first delay amount is an amount less than about 30% of the symbol length and greater than 100 wavelengths of the second optical beam.

In a second embodiment, a method of transmitting optical signals includes receiving first data and receiving at least one optical beam. A first modulated optical beam is transmitted, using the at least one received optical beam, and encoded with the first data in accordance with a predetermined phase modulation scheme. A second modulated optical beam is transmitted, using the at least one optical beam, and encoded with the first data in accordance with the predetermined phase modulation scheme. The second modulated optical beam is a time-delayed version of the first modulated optical beam.

In a third embodiment, there is provided a method of receiving optical signals including receiving, at an etalon-based optical receiver, a first optical beam modulated in accordance with a first signal, the first optical beam carrying data and comprising phase modulations, and receiving, at the etalon-based optical receiver, a second optical beam modulated according to the first signal, the second optical beam carrying the data and comprising phase modulations, and wherein the received second optical beam is a time-delayed version of the received first optical beam. The received first optical beam is converted into a first intensity-modulated (IM) beam, and the received second optical beam is converted into a second IM beam. A detector receives the first IM beam and the second IM beam and generates and outputs an electrical signal having a magnitude indicative of intensity of the first IM beam and the second IM beam.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

For simplicity and clarity, some features and components are not explicitly shown in every figure, including those illustrated in connection with other figures. It will be understood that any features and components illustrated in the figures may be employed in any of the embodiments described. Omission of a feature or component from a particular figure is for purposes of simplicity and clarity and is not meant to imply that the feature or component cannot be employed in the embodiments described in connection with that figure.

For purposes of this disclosure and as will be understood by those skilled in the art, the terms "light," "light signal," and "optical signal" may be used interchangeably and generally refer to an electromagnetic signal that propagates through a given medium, which may be empty space (such as a vacuum) or an atmospheric medium (such as air). These terms are not meant to imply any particular characteristic of the light, such as frequency, wavelength, band, coherency, spectral density, quality factor, etc., unless it is expressly stated or contextually clear that such a characteristic is intended.

As described above, conventional optical receivers for line-of-sight communications using modulated light waves are configured to collect signals from a large area so that the acquired signal power allows for accurate detection, and various optics enable the capture and focus of light waves to concentrate the signal power at a detector in the receiver. For some modulation schemes, such as phase modulation, conventional receivers require coherent light, so a laser is often used as the light source. When such light is collected and focused, the best reception occurs if all the light rays (across the cross-section of a telescope) arrive at the detector in unison as a single wavefront, maintaining alignment of the original phase relationships of the light rays. However, when light rays have propagated through different media along the way or are skewed, delayed, aberrated, or otherwise affected as is typical for light waves traveling some distance through the atmosphere, free space, or any other media, the light rays tend to erode and ultimately destroy the coherency of the optical signal. Without some form of wavefront correction in such systems, it is difficult or impossible for conventional receivers to accurately demodulate an incoming optical signal.

Thus, while it is generally desirable to maintain or recover the coherency of a received optical signal or compensate for a lack of coherency, this is often difficult to achieve. Some prior approaches use adaptive optics to compensate for wavefront variations caused by air perturbations (also known as scintillation). Adaptive optics perform wavefront correction directly on light rays and physically correct variations. However, these approaches often have size and weight disadvantages. Also, precise alignment of all elements of an adaptive optics system and precise control of the adaptive optics are generally required for acceptable operation and can be difficult to achieve.

This disclosure provides systems and methods for generation and reception of phase-encoded (phase modulated) optical signals without the need for a locally coherent clock source (meaning no local laser or oscillator is needed at a receiver). In some embodiments, an optical resonator, etalon (such as a Fabry-Perot filter/resonator) or other functionally equivalent structure or device, is used to convert a phase modulated optical signal into an intensity-encoded optical signal. The intensity-encoded optical signal may be used to detect information encoded in the phase modulated optical signal. Various benefits can be achieved, at least in part, using an optical front-end that includes an optical resonator configured to detect modulation transitions, such as phase variations, in a received optical signal without a coherent reference source. The optical resonator further transforms the modulation, such as the phase modulation, into an intensity modulation that allows simplified processing, such as in the electrical domain.

Examples of various systems for which demodulation of phase-modulated optical signals may be useful or beneficial can include communication systems, target designators, laser guidance systems, laser sight, laser scanners, three-dimensional (3D) scanners, homing beacons, and surveying systems. In at least some of these examples, an optical signal is emitted and travels via a free space signal path (known as free space optical or "FSO") to an optical receiver. Although typically for use in free space propagation, the features and components described here may be utilized in other embodiments, such as those employing a fiber coupling or another waveguide system. Systems and method for demodulation of phase-modulated optical signals in accordance with aspects and examples disclosed here may be applied to any of the above example optical systems or other systems to generate, transmit, receive, detect, and recover useful information from an optical signal having phase encoding.

Those of ordinary skill in the art will understand that optical signals modulated to carry information have one or more characteristics that are changed by a transmitter in either a continuous or discrete fashion or some combination of the two, and segments of the light over time may be associated with the particular characteristic(s) that indicate the information being conveyed. For example, a phase modulated digital optical transmitter may emit coherent light of a certain phase relationship (relative to a reference time and/or phase) to indicate a particular value. The light emitted to indicate the value may be considered a segment or length of light whose phase indicates the value. Later, the transmitter will alter the light characteristic to emit a second segment of light to indicate a second value, then a third segment of light, then a fourth segment of light, and so on. As will be appreciated, a "symbol" is transmitted within each segment, and the segment length is often referred to as the symbol length. The rate at which the transmitter discretely alters the characteristic, as in this example, is a modulation rate of the transmitter, also known as a symbol rate. Each segment of light has an associated physical length that is based upon the duration and the speed of light in the propagation medium. For example, a modulation rate of $10^8$ symbols per second (100 million transitions per second) emits light segments of 10 nanosecond duration with a length of approximately 3 meters. Higher modulation rates generate shorter light segments, and lower modulation rates generate longer light segments. Various embodiments of this disclosure may operate at even higher transmission rates, such as 1 trillion transitions per second (1 Giga symbol/sec) or more. It will be understood that a single light segment may have one of multiple phase values (and possibly amplitude values), and therefore the indicated value may be a multi-bit binary value (symbol). Accordingly, modulation rate is not necessarily equal to a transmission bit rate for a transmission system.

In addition to phase modulation of the emitted light, some optical transmission systems may alter different or additional light characteristics, such as amplitude, frequency, or wavelength, and may also vary the modulation rate over time, such as based on channel characteristics, noise, error rate, and the like. Additionally, some optical transmission systems may modulate light in an analog fashion, such as by a continuous variation in amplitude of the light signal, and therefore not employ a modulation rate per se. For purposes of this disclosure, aspects and embodiments are generally described in the context of a discrete transmission system including phase modulation, although it will be understood that aspects and embodiments disclosed here may be equally useful as transmitters and receivers for transmission systems that generate light signals conveying information differently than that described (such as a combination of phase and amplitude modulations).

In addition, it will be understood that examples of methods and apparatuses discussed herein are not limited in application to the details of construction and the arrangement of components set forth in the following description or illustrated in the accompanying drawings. The methods and apparatuses are capable of implementation in other examples and of being practiced or carried out in various ways. Examples of specific implementations are provided here for illustrative purposes only and are not intended to be limiting. Also, the phraseology and terminology used here are for purposes of description and should not be regarded as limiting. Thus, for example, any references to front and back, left and right, top and bottom, upper and lower, or vertical and horizontal are intended for convenience of description, not to limit the present systems and methods or their components to any one positional or spatial orientation.

Figure 1:
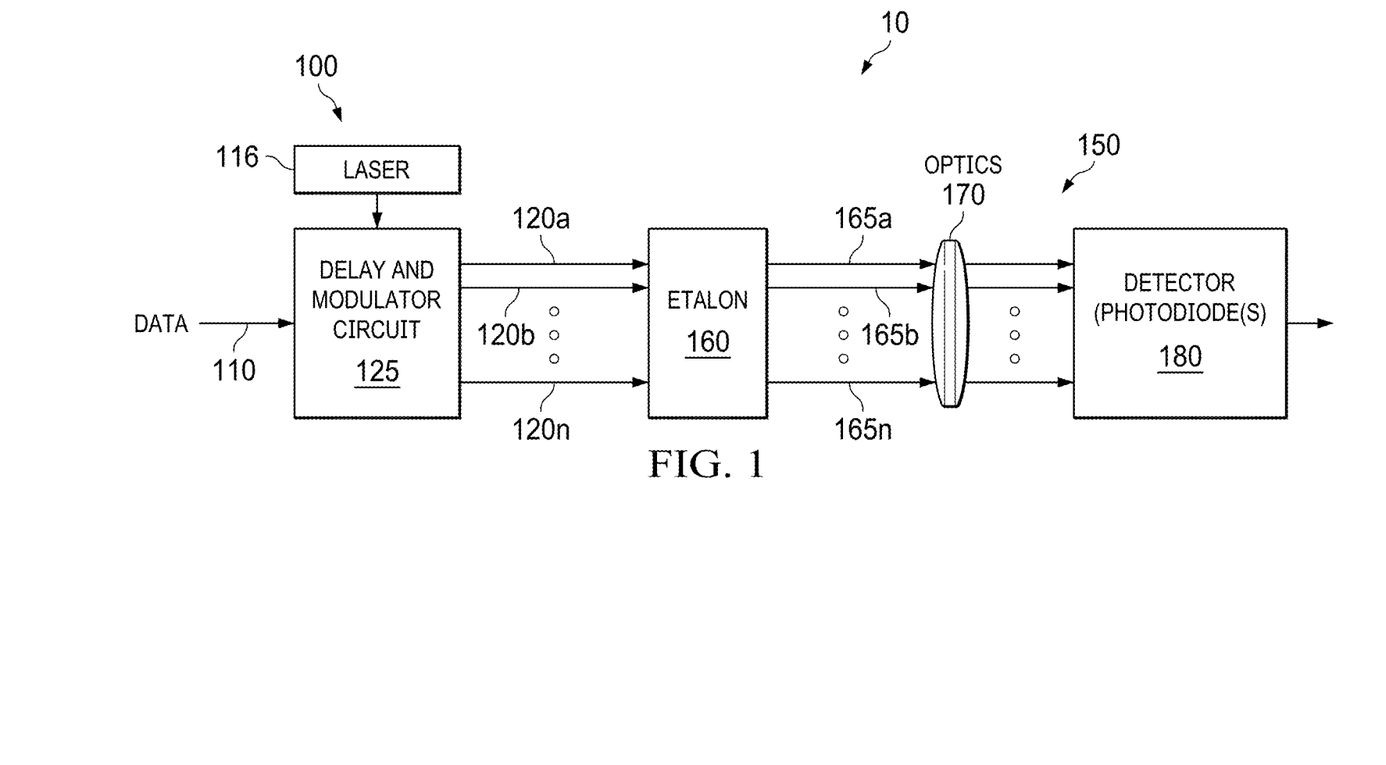
FIG. 1 illustrates an example laser-based communication system having a multi-source (multi-laser) transmitter and an etalon-based receiver in accordance with this disclosure.

FIG. 1 illustrates an example laser-based communication system 10 including a laser optical transmitter 100 and an etalon-based receiver 150 in accordance with this disclosure. Note that while the components of the optical transmitter 100 and the optical receiver 150 identified in FIG. 1 (and other Figures) may be shown and described as discrete elements in a block diagram and may be referred to as "module," "circuitry," or "circuit," these components may be implemented in any suitable manner. For example, these components may be implemented as one or a combination of analog circuitry, digital circuitry, or one or more processing devices executing software instructions. In some embodiments, components may be implemented using one or more microprocessors, microcontrollers, digital signal processors (DSPs), application-specific integrated circuits (ASICs), or field programmable gate arrays (FPGAs). Unless otherwise indicated, signal lines between components of the optical transmitter 100 and between components of the optical receiver 150 may be implemented as discrete analog, digital, or optical signal lines. Some of the processing operations may be expressed in terms of calculations or determinations performed by the optical transmitter 100, the optical receiver 150, a detector, a controller, or other components. The equivalent of calculating and determining values or other elements can be performed by any suitable analog or digital signal processing techniques and are included within the scope of this disclosure. Unless otherwise indicated, signals may be encoded in either digital or analog form.

In the illustrated embodiment, the optical transmitter 100 includes a delay and modulation circuit (or a communications circuit or circuitry) 125a configured to receive one or more optical beams from a laser source 116 and an input/data signal 110, such as a digital bit stream. As will be appreciated, the delay and modulation circuit (or communications circuit or circuitry) 125a receives the input information and controls modulation of the one or more optical beams to generate and output a plurality of modulated or encoded optical beams 120a-120n each carrying the same input information. Each of the beams 120a-120n are modulated in the same manner and carry the same data. However, at least one of the modulated optical beams 120a-120n is time shifted, or delayed in time (time-delayed) with respect to another one of the modulated optical beams. In other words, the timing or time position of the data (or symbols) carried on one respective optical beam is shifted relative the data (or symbols) carried on another respective optical beam. This results in a time difference (or phase delay) between when the symbol transitions occur in one respective optical beam and when the same symbol transitions occur in the other respective optical beam.

The one or more optical beams are controlled or modulated in accordance with a desired encoding protocol established for transmission of the information. In other words, one or more control signal(s) are generated that, when applied to a modulator, modulate or modify properties of the optical beam(s) in order to carry the information. It will be understood that the input/data signal 110 including the data may be in analog or digital form. In addition, in one embodiment, the optical beams 120a-120n each have essentially the same wavelength of light, while in another embodiment, the optical beams 120a-120n have similar wavelengths. Similar wavelengths are wavelengths that satisfy the equation $N\lambda_i/2 = nL + \Delta L_i$ where N is integer, nL is the optical length of the etalon (at the receiver), 2 is the wavelength of the beam "i", and values of $|\Delta L_i|/\lambda_i$ are less within 5% of each other, and in some embodiments within 1% or 2% from each other.

As will be described in further detail below and in other figures, generating the modulated optical beams 120a-120n having delay(s) with respect to each other may be implemented or accomplished in different ways. In various embodiments, one or more delay(s) may be added in electrical signal path(s), one or more delays may be added in optical path(s), or in a combination thereof.

One example of adding delay(s) in the electrical path may include duplicating or splitting the input signal 110 (or signal(s) generated after encoding) into a plurality of such signals, adding delay(s) to one or more of the signals to produce a plurality of time-shifted signals, and applying each signal to corresponding modulators that generate the corresponding modulated optical beams 120a-120n.

One example of adding delay(s) in the optical path may include applying the input signal 110 (or signal generated after encoding) to a modulator to generate one modulated optical beam which is then split or duplicated and an optical delay may be inserted into one or more of the split optical beams to output the corresponding modulated optical beams 120a-120n. Another example of adding delay(s) in the optical path may include applying the input signal 110 (or signal generated after encoding) to a plurality of modulators (each receiving a separate optical beam) that generate a plurality of modulated optical beams (identical with respect to the timing of the data being carried), and then an optical delay may be inserted into one or more of the modulated optical beams to output the corresponding modulated optical beams 120a-120n. As will be appreciated, numerous configurations and arrangements may be utilized as desired to generate the modulated optical beams 120a-120n with at least one being time-delayed with respect to another.

In the illustrated embodiment in FIG. 1, the optical receiver 150 includes an optical resonator/etalon 160, one or more optics 170, and a detector 180.

As will be appreciated, the optical receiver 150 is referred to as an "etalon-based" receiver. An "etalon-based" receiver includes an "etalon" which includes various devices and structures. Note that the use of the term "etalon" and "resonator" throughout this disclosure is not intended to be limiting and as used here may include any of multiple structures, such as plates with reflecting surfaces and parallel mirrors with various materials (which may or may not include active optical materials) positioned in-between. The spacing between the first semi-reflective surface and the second semi-reflective surface of an etalon may be referred to as a "cavity" but is not so limited. Optical resonators and etalons may include other suitable structures, such interferometers and the like. Additionally, resonator and etalon structures may be formed as a laminate, layer, film, coating, or the like. This may include Fabry-Perot etalons, microrings, optical delay line(s), optical resonators or other types of resonators, which are configured to sense variations, such as phase variations or modulations, in the received optical signals 120a-120n. Accordingly, all of the foregoing structures and devices are commonly referred to as an "etalon" herein.

The etalon 160 may include one or multiple resonators or etalons. In other embodiments, for example, each of the received modulated optical signals 120 has a corresponding etalon 160. If separate etalons 160 are used for different signals, different optics 170 may be used with the different etalons 160, and different detectors 180 may be used with the different etalons 160 and the different optics 170.

In some embodiments, the etalon 160 may be coupled to a pump source (such as a laser), which may excite one or more components (such as an active optical medium) of the etalon 160 to generate an optical gain in the received optical signals 120a-120n. The variations in each of the received optical signals 120a-120n are representative of the modulation performed at the optical transmitter 100. That is, the variations may be representative of information encoded at the optical transmitter 100. The etalon 160 transforms the variations into an intensity modulation of output optical signal energy, which are shown as output optical signal energy 165a-165n in FIG. 1B. More specifically, the etalon 160 converts a phase modulation of each received optical signal 120a-120n in part by interaction of the arriving optical signal 120a-120n with resonant optical signal energy accumulated within the etalon 160.

In some embodiments, the etalon 160 (or multiple etalons) may include a pair of parallel semi-reflective surfaces with an at least semi-transparent medium interposed therebetween. The semi-transparent medium may represent an active optical medium that provides an optical gain (such as an amplitude increase) when excited by an optical or electrical signal. For additional examples of optical resonators and etalons (and details thereof), reference can be made to U.S. Pat. No. 10,313,022, which has been incorporated by reference.

The etalon 160 may have one or more characteristic resonant frequencies, each associated with a certain wavelength of light, based upon the spacing (the optical length) between the semi-reflective surfaces. In some embodiments, the surfaces are semi-reflective and semi-transmissive, allowing some light through. Accordingly, the arriving optical signals 120a-120n may be allowed into the etalon 160 (between the pair of semi-reflective surfaces) and may resonate inside the etalon 160 and between the pair of semi-reflective surfaces. In addition, some of the resonating optical signal energy inside the etalon 160 is emitted from the etalon 160 through one of the semi-transmissive surfaces (referred to as the "output optical signal energy"). The output optical signal energy emitted from the etalon 160 is shown here as the optical signal energy 165a-165n in FIG. 1.

The optical signals 120a-120n received at the etalon 160 may establish a steady-state energy-preserving condition in which each optical signal 120a-120n continuously arrives at the etalon 160, accumulates or adds to build-up resonating optical signal energy inside the etalon 160, and emerges from the etalon 160 at a constant rate (meaning a steady-state output value). A variation in the arriving phase and/or frequency of each of the optical signals 120a-120n will disrupt the optical signal energy resonating inside the etalon 160 and, accordingly, disturb the corresponding output optical signal energy 165a-165n. Once the steady-state condition is re-established (meaning each respective optical signal 120a-120n arrives at a constant rate without a variation), the respective output optical signal energy 165a-165n returns to the corresponding constant rate.

Accordingly, a change in phase, frequency, or amplitude of the arriving optical signals 120a-120n causes a change in intensity of the emerging output optical signal energy 165a-165n. A large phase transition in the arriving optical signals 120a-120n, for example, causes a large (but temporary) intensity change in the emerging output optical signal energy 165a-165n. Similar operation occurs in a micro-ring or other optical resonator. Accordingly, in various examples, the etalon 160 functions as a demodulator or a modulation converter for one or more received optical signals 120a-120n. Each of the emerging output optical signal energy 165a-165n therefore carries the same informational content as the arriving optical signals 120a-120n, but in intensity-modulated form.

The output optical signal energy 165a-165n is directed to the detector 180 via the optics 170. The detector 180 converts the emerging intensity-modulated output optical signal energy 165a-165n into an electrical signal 185. In some embodiments, the detector 180 may include one or more photodetectors, such as one or more photodiodes. In the embodiment shown, the detector 180 functions to sum the intensity-modulated output optical signal energy 165a-165n and output the electrical signal 185 (representing the total power received at the detector 180. The electrical signal 185 may be further processed by a digital or analog processing subsystem to recover the data payload. One example of such a processing subsystem is described in U.S. Pat. No. 10,313,022 and includes an analog-to-digital converter and a digital processing subsystem (which may function as a correlator and a code generator or which may perform any other suitable processing). Reference is also made to U.S. Pat. No. 10,305,602 (which is hereby incorporated by reference in its entirety) for a description of a demodulator for the demodulation of a QAM-modulated optical beam (having I and Q components) using multiple etalons and various output responses of etalons to phase transitions in the received optical signal.

As will be appreciated, in another embodiment (not shown), the detector 180 may generate and output multiple electrical signals that correspond to each of the optical signal energy beams 165a-165n received at the detector 180. These multiple electrical signals may be further processed individually by a digital or analog processing subsystem to recover the data payload, or otherwise summed and then processed.

In some embodiments, the optical receiver 150 may include additional or fewer optics than discussed above and may omit or add various other components relative to those discussed above. For example, the optics 170 may include focusing optics configured to receive the emerging output optical signal energy 165a-165n from the etalon 160 and to focus the output optical signal energy 165a-165n on the detector(s) 180. Also, the optical receiver 150 may include one or more optics that focus or otherwise collect and direct the received optical signals 120a-120n to the etalon 160.

In some embodiments, the etalon 160 may include reflective surfaces (including semi-reflective surfaces) that are not co-planar and/or are not co-linear. For example, an interior reflective surface of an etalon 160 may include some curvature, and an opposing surface may also be curved such that a distance between the two surfaces is substantially constant across various regions of the etalon 160. In other embodiments, an etalon 160 may have non-linear or non-planar surfaces with varying distances between the surfaces at various regions and may still function as an optical resonator or etalon for various wavelengths and at various regions suitable for use in examples discussed here. Accordingly, an etalon 160 may be purposefully designed to conform to a surface or to have various regions responsive to differing wavelengths or responsive to differing angles of arrival for a given wavelength.

In some embodiments, the etalon 160 may be coupled to a pump source, which may excite one or more components (such as an active optical medium) of the etalon 160 to generate an optical gain in one or more received optical signals. In other embodiments, the etalon 160 may not include any pump source.

Figure 2A:
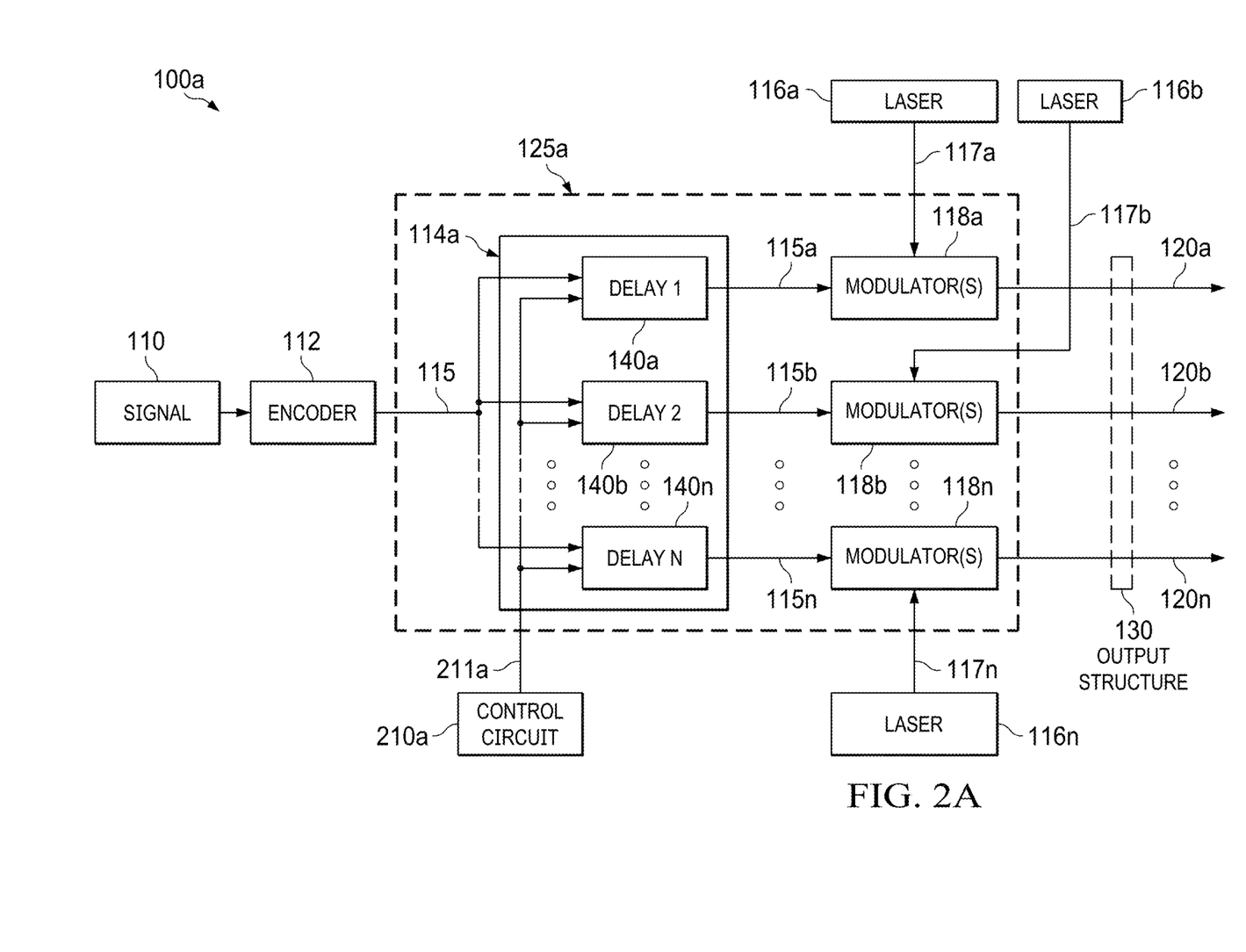
FIG. 2A illustrates one embodiment of the transmitter shown in FIG. 1 in accordance with this disclosure.

Now turning to FIG. 2A, there is shown one example (and more detailed) embodiment of the optical transmitter 100 of FIG. 1, denoted in FIG. 2A as optical transmitter 100a. As will be understood, the optical transmitter 100a illustrates an optical transmitter in which one or more delay(s) are incorporated or inserted into an electrical signal path which results in the desired modulated optical beams 120a-120n. For ease of reference and example, this embodiment is illustrated with reference to outputting at least three modulated optical beams 120a, 120b, 120n. In other embodiments, the number of transmitted beams 120 may be two or more.

In this embodiment, a delay and modulator circuit 125a is shown as including a phase or time delay circuit 114a having delay elements 140a-140n and a plurality of modulators 118a-118n—one for each optical beam. Also in this specific embodiment, the laser source 116 includes a plurality of laser sources 116a-116n each outputting an optical beam to be modulated by the respective modulator 118a-118n.

In one embodiment, the raw data or input signal 110 is applied to an encoder 112 that generates one or more control signals 115 for controlling, at a minimum, phase modulation of the optical beam(s) by the modulators 118a-118n. In other embodiments, the signal(s) 115 may include multiple signals each to control a modulation of a different property of the optical beams, e.g., phase, amplitude, frequency, wavelength, etc. For example, the control signal(s) 115 may include two signals—one for controlling phase modulation and another controlling amplitude modulation. Various combinations may be utilized. Depending on the specific protocol, this may result in modulating the optical beam(s) to carry information in a QAM-type modulation scheme (both phase and amplitude) as ultimately applied to the optical beam. As will be appreciated, other types of ultimate modulation schemes may be used, such as n-QAM, phase-shift keying (xPSK), etc., and the encoder 112 is not limited in generating the content and structure of the control signal(s) 115 for controlling the modulators. It will be understood that the specific protocol(s)—or specific encoding and modulation scheme(s))—which describe the correspondence between the transmitted information and the changes in the optical beam properties are not further described, nor are any further descriptions otherwise required for an understanding of the concepts taught herein. As will be described below, those skilled in the art will understand that benefits of the system described herein can be achieved from detecting changes in phase (or equivalent change in frequency).

The optical transmitter 100a includes a plurality of optical sources 116a-116n, such as different laser sources, each for generating and emitting a respective light/optical beam or wave 117a-117n (optical signals). Any number of optical sources 116a-116n may be utilized, as desired, including an embodiment in which there is a laser source that generates single optical beam 117 that is split and applied to each of the modulator(s) 118a-118n. Each optical source 116a-116n emits the light beam 117a-117n that is modulated by a modulator 118a-118n to generate and output the modulated optical signal or beam 120a-120n. As will be appreciated, each modulator 118 may be configured to modulate each respective light beam 117 in one or more ways.

In some embodiments, the optical sources 116a-116b output light having the same wavelength or similar wavelengths. Each of the optical sources 116a-116n is either aligned to or aimed at the optical receiver 150, and the optical sources 116a-116n are spatially disposed from each other. The actual spacing or positioning of the optical sources 116a-116n may vary. In one embodiment, an output structure 130, such as various optics, that may include one or more optical lens or other optical transmission components, may be used to direct the modulated optical signals or beams 120a-120n towards a target, i.e., the optical receiver 150, as needed.

Depending on the positional accuracy of the multiple lasers 116a-116n with respect to each other, as well as the layout configuration of components and conductors in the transmitter, one laser's output may be effectively time delayed or offset with respect to another laser's output—even with no delay intentionally added using one of the delay elements 140a-140n. Though largely unintentional, such delay(s) may result in a significant time delay between outputs thereby causing difficulty for conventional receivers to receive/decode the received beams.

In one embodiment, the modulator 118 functions to phase modulate (phase modulation) the light beam 117 in response to the control signal(s) 115. It will be understood that, depending on the magnitude of the phase change, that either the term "phase modulation" or "frequency modulation" could be used. Although in many cases, phase modulation is considered to be different from frequency modulation, this patent document defines phase modulation to include both phase and frequency changes, unless specifically stated otherwise or is readily ascertainable from the context of use. Thus, the term "phase modulation" as utilized herein is intended to be broad and include equivalent changes in frequency. Further, in other embodiments, one or more other techniques known to those skilled in the art can also be applied or performed to modulate a characteristic of the light beam 117, such as amplitude, frequency, wavelength or variation in the modulation rate over time.

The phase or time delay circuit 114a is configured to receive the control signal(s) 115 and generate one or more time-delayed control signal(s) 115a-115n—as shown. As will be appreciated, each of the signals 115a-115n are duplicates or copies of the original signal(s) 115, but are shifted in time with respect to each other. In other words, other than being shifted in time (a phase difference) with respect to each other, each of the signals 115a-115n correspond or match, or otherwise have essentially the same waveform. Also, not each of the signals 115a-115n are required to have different time shifts or differentials. In most embodiments, at least one should be offset in time from another one.

Each of the time-delayed control signal(s) 115a-115n is input to each of the respective modulators 118a-118n to individually modulate the respective light beams 117a-117n output from the optical sources 116a-116n. The phase or time delay circuit 114a functions to intentionally inject a time or phase delay into one or more of the replicated control signal(s). In some embodiments, for example, the circuit 114 includes one or more delay elements 140a-140n, where each delay element functions to inject or generate a time delay of a predetermined specified amount (which can be fixed, programmable, or otherwise variable).

The delay elements 140a-140n include any suitable structures configured to delay an electrical signal by one or more fixed or controllable amounts. In some embodiments, each of the delay elements 140a-140n may represent separate components, such as when each of the delay elements 140a-140n is implemented using separate inverter chains or other sequential delay elements. In other embodiments, the delay elements 140a-140n may be implemented using a common structure, such as when all of the delay elements 140a-140n are implemented using a single inverter chain or other sequential delay elements (with taps at given locations for desired amounts of delay). Note that it may also be possible to implement different delay amounts using different electrical traces/conductors of different lengths. In general, this disclosure is not limited to any particular technique or structures for delaying an electrical signal by a fixed or controllable amount.

In FIG. 2A, the transmitter 100a is shown having an optional control circuit 210a (shown in block diagram form). Persons of ordinary skill in the art will readily understand that any suitable device(s), logic, or circuits (and methods) may be utilized, as desired, to generate and output delay control signals for controlling the delay elements 140a-140n to provide delay(s) in the signal paths 115a-115n in accordance with the teachings herein. As will be appreciated, the control circuit 210a may be controlled by a processor (not shown) operating in accordance with one or more software or firmware programs. The control circuit 210a may be further configured to operate the transmitter 100a in one or more modes of operation, as described below.

As described above, the phase or time delay circuit 114 receives the control signal(s) 115 and applies the signal(s) 115 to each of multiple delay elements 140a-140n, which are optionally controlled using one or more signals 211a from the control circuit 210a. Collectively, the delay elements 140a-140n output respective delayed control signals 115a-115n, where each control signal 115a-115n has been delayed or shifted by the respective delay amount. The delayed control signals 115a-115n are then applied to the modulators 118a-118n which modulate the light beams 117a-117n in accordance therewith, to generate the modulated optical signals 120a-120n. In another embodiment, for example, one of the control signals 115a-115n may represent an undelayed version of the control signal(s) 115, and no delay element may be used to generate that version of the control signal.

The length of the delay(s) introduced by the circuit 114 will generally be less than a symbol length (length of symbol encoded in the data signal 115), but substantially larger in magnitude in terms of the wavelength(s) of the optical sources 116a-116n. The introduction of delays or time offsets in one or more of the control signals 115a-115n effectively renders the transmitted optical signals 120a-120n extremely difficult to receive and demodulate in conventional receivers that utilize adaptive optics and fiber, making them hard-to-intercept. It has been found that when the time delays between the optical sources 116a-116n are small relative to the length of a transmitted symbol, all symbols can be still recovered by the optical receiver 150 described herein. In other words, the injected time delay has virtually no effect on reception and demodulation of the underlying symbols and data. Therefore, multiple-laser transmissions can be used in place of single-laser transmission, provided the total power requirements are met or essentially the same.

Without the introduction of one or more delays, conventional receivers utilizing adaptive optics and fiber (now or in the future) will generally have the ability to receive and demodulate the optical signals 120a-120n transmitted from the multiple optical sources 116a-116n. In some embodiments, the transmitter 100a may therefore enable or support two different modes of receiver operation. A hard-to-intercept mode can be enabled when one or more delays are added in one or more paths of the control signals 115a-115n. In this mode, the transmitted signals 120a-120n are successfully received and demodulated using the optical receiver 150 in accordance with this disclosure. A normal mode can be enabled when no delays are added. In this mode, although the transmitted signals 120a-120n can still be successfully received and demodulated using the optical receiver 150, a conventional receiver using adaptive optics and fiber may also have the ability to successfully receive and demodulate the transmitted signals 120a-120n.

The amount (or length) of the delay(s) may be fixed, dynamic, programmable, variable, or involve any combination(s) thereof. In other embodiments, the amount/length of the delay(s) may vary randomly—which would necessarily increase the distortions and incoherency of the transmitted light beams 120a-120n and render reception by a conventional receiver even more difficult. These may be random delay amount(s) in the signal path(s) and for random period(s) of time.

In one embodiment, the laser-based communication system 10 utilizes multiple laser optical sources 116a-116n and simultaneously modulates each of the multiple optical sources 116a-116n (with no intentionally-added delays in the encoded data signal path) in essence according to the same encoded data signal 115. Prior systems that utilize a single laser source (single channel) require all of the received optical power at a receiver to originate from the single high-power laser source. In contrast, the multiple laser optical sources 116a-116n in the laser-based communication system 10 enables the use of lower cost low-power lasers, where an additive effect is achieved by the etalon 160 when receiving multiple versions of the same signal (the optical signals 120a-120n) from the multiple optical sources 116a-116n and modulators 118a-118n.

In another embodiment, the laser-based communication system 10 utilizes multiple laser optical sources 116a-116n and modulates at least one of the multiple optical sources 116a-116n with one of the control signals 115a-115n and modulates at least another one of the multiple optical sources 116a-116n with a delayed (or time offset) version of the control signals 115a-115. In other embodiments, any number of additional path(s) and delay(s) may be provided, and delay amount(s) for all or some of the delay elements 140a-140n may be different, resulting in encoded data signals in which at least one is offset in time from another one (or more). As will be described further below, the inclusion of a substantial delay in application of at least one of the control signal(s) 115a-115n to one or more of the light beams 117a-117n will render the transmitted beams 120a-120n difficult to detect/receive/recover by a conventional optical receiver—even when adaptive optics may be utilized. Insertion of such a delay (or delays) causes substantial wavefront distortion or mismatch (or incoherency) in the transmitted beams 120a-120n that renders them difficult to detect.

Although FIG. 1 illustrates one example of a laser-based communication system 10 having a multi-source (multi-laser) transmitter 100 (or 100a shown in FIG. 2A) and an etalon-based receiver 150, various changes may be made to the system. For example, the system 10 may include any suitable number of transmitters 100, receivers 150, and/or transceivers incorporating transmitters 100 and receivers 150.

It will be appreciated that only those components of the optical transmitter 100, 100a needed to explain and understand the concepts, methods, and systems disclosed herein are shown in the FIGURES and described herein. Although not shown, the optical transmitter 100, 100a may include various other components as needed or desired. In some embodiments, the optical transmitter 100a may be configured in the same or similar manner as the optical transmitter described in U.S. Pat. No. 10,313,022 (which is hereby incorporated by reference in its entirety) and may further include a forward error correction (FEC) module, a spreading module, a mapping module, and/or a pulse-shaping filter. Additional optics may also be included, such as one or more mirrors or lenses, which direct each of the modulated optical signals or beams 120a-120n for output. For example, the optics can be used to direct the modulated optical signals 120a-120n in a direction of the optical receiver 150 via a signal path as shown in FIG. 1.

Note that while communication in FIG. 1 is shown as being one-way from the optical transmitter 100 to the optical receiver 150, end devices may include both an optical transmitter 100 and an optical receiver 150 (such as an optical transceiver) to support bidirectional data communication. Each transceiver may be capable of bidirectional data communication with another transmitter/receiver pair.

Figure 2B:
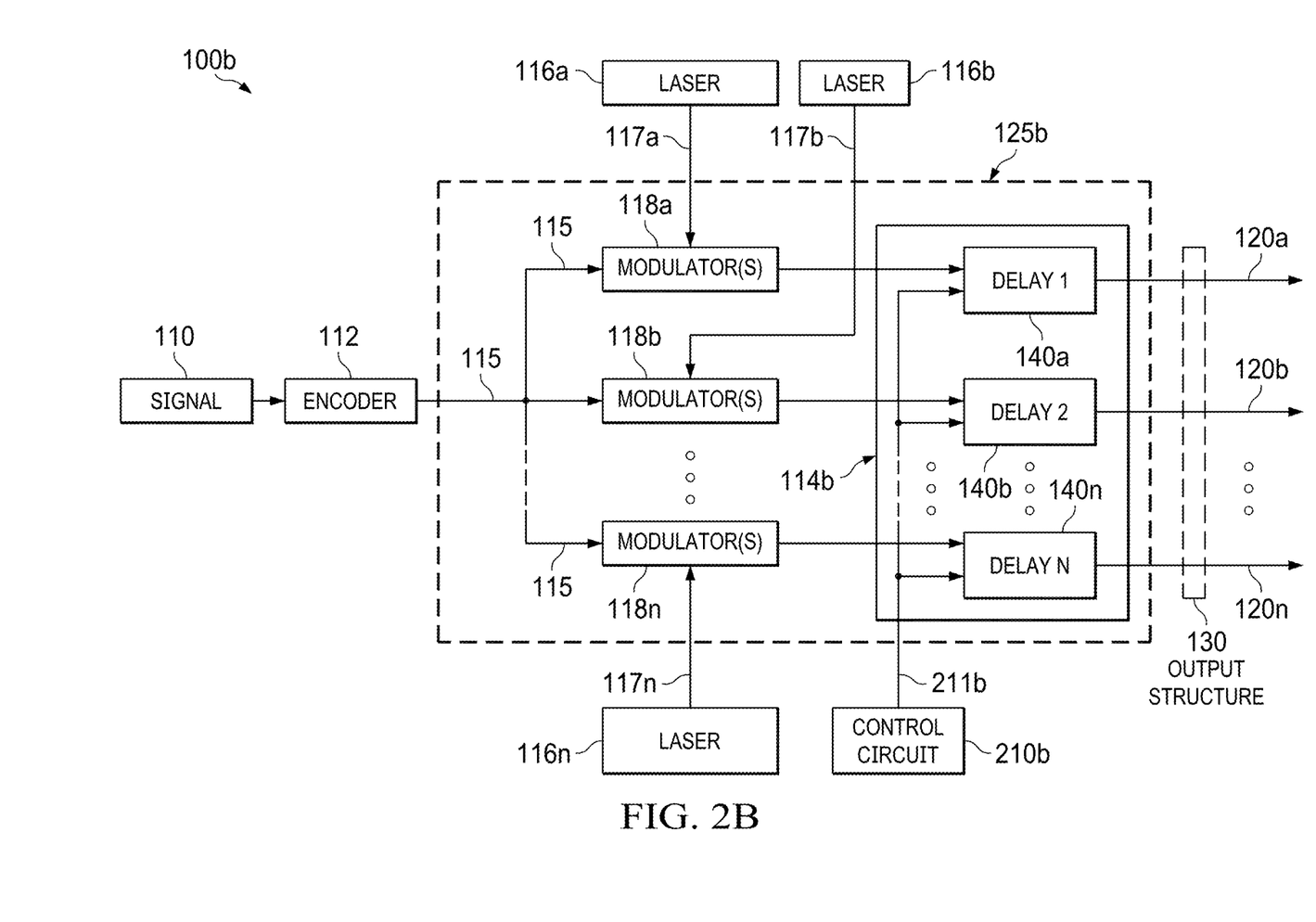
FIG. 2B illustrates another embodiment of the transmitter shown in FIG. 1 in accordance with this disclosure.

Now turning to FIG. 2B, there is shown another example (and more detailed) embodiment of the optical transmitter 100 of FIG. 1, denoted in FIG. 2B as optical transmitter 100b. As will be understood, the optical transmitter 100b illustrates an optical transmitter in which one or more delay(s) are incorporated or inserted into an optical signal path which results in the desired modulated optical beams 120a-120n. For ease of reference and example, this embodiment is illustrated with reference to outputting at least three modulated optical beams 120a, 120b, 120n. In other embodiments, the number of transmitted beams 120 may be two or more.

The transmitter 100b of FIG. 2B includes various components shown in the transmitter 100a of FIG. 2A and described above. As will be appreciated, the transmitter 100b may form one component in another embodiment of a laser-based communication system that also includes the etalon-based receiver 150 illustrated in FIG. 1. One obvious difference between the transmitters 100a and 100b is the position and configuration of the phase or time delay circuit 114. In transmitter 100a, the delay circuit 114a is disposed to provide delay(s) in one or more electrical path(s) to perform electrical path delaying, while in transmitter 100b, a delay circuit 114b is disposed to provide delay(s) in one or more optical path(s) (after the optical beams have been modulated) to perform optical path delaying.

In one embodiment, the raw data or input signal 110 is applied to the encoder 112 that generates the one or more control signals 115 for controlling, at a minimum, phase modulation of the optical beam(s) by the modulators 118a-118n—as similarly described above with respect to optical transmitter 100a. Also, in the specific embodiment illustrated, the optical transmitter 100b includes a plurality of optical sources 116a-116n, such as different laser sources, each for generating and emitting a respective light/optical beam or wave 117a-117n (optical signals). Any number of optical sources 116a-116n may be utilized, as desired, including an embodiment in which there is a laser source that generates a single optical beam 117 that may be split (e.g., optical splitter, not shown) and applied to each of the modulator(s) 118a-118n. In the embodiment shown, each optical source 116a-116n emits the light beam 117a-117n that is modulated and output by the modulator 118a-118n to generate modulated optical signals or beams.

One or more of the modulated optical signals or beams coming from the modulators 118a-118n are input to a delay circuit 114b. The phase or time delay circuit 114b functions to intentionally inject a time or phase delay into one or more of the modulated optical beams prior to transmission to a target. In some embodiments, for example, the circuit 114b includes one or more delay elements 141a-141n, where each delay element functions to inject or generate a time delay of a predetermined specified amount (which can be fixed, programmable, or otherwise variable).

The delay elements 141a-141n (optical delay lines or elements) include any suitable structures configured to delay an optical signal by one or more fixed or controllable amounts. In some embodiments, each of the delay elements 141a-141n may represent separate components, such as when each of the delay elements 141a-141n is implemented using separate chains or other sequential delay elements. In other embodiments, the delay elements 141a-141n may be implemented using a common structure, such as when all of the delay elements 141a-141n are implemented using a single chain or other sequential delay elements (with taps at given locations for desired amounts of delay). Various structure(s) or methods are known to, and may be implemented by, those of skill in the art. In general, this disclosure is not limited to any particular technique or structures for delaying an optical signal by a fixed or controllable amount.

In FIG. 2B, the transmitter 100b is shown having an optional control circuit 210b (shown in block diagram form). Persons of ordinary skill in the art will readily understand that any suitable structure(s), device(s), logic, or circuits (and methods) may be utilized, as desired, to generate and output delay control signals for controlling the delay elements 141a-141n to provide delay(s) in accordance with the teachings herein. As will be appreciated, the control circuit 210b may be controlled by a processor (not shown) operating in accordance with one or more software or firmware programs. The control circuit 210b may be further configured to operate the transmitter 100b in one or more modes of operation, as described above with respect to optical transmitter 100a.

In FIG. 2B, the phase or time delay circuit 114b receives the modulated optical signals output from the modulators 118a-118n applies one or more optical delays which are optionally controlled using one or more signals 211b from the control circuit 210b. Collectively, the delay elements 141a-141n output the respective delayed modulated optical beams 120a-120n. In another embodiment, for example, one of the modulated optical beams 120a-120n may represent an undelayed version and no delay element may be used to generate that version of the control signal.

The length of the delay(s) introduced by the circuit 114b will generally be the same as the delay(s) introduced by the circuit 114a in the embodiment shown in FIG. 2A. As will be appreciated, the operational description, various embodiments, teachings, and concepts applicable and described above with respect to operation of the optical transmitter 100a above are also applicable and may be applied to the optical transmitter 100b.

Although the embodiments of the transmitters 100a and 100b are shown separately, a person of skill in the art will understand that the two embodiments could be combined in whole or in part to generate the modulated optical beams 120a-120n in which at least one of the beams is time-shifted or delayed from another one of the beams.

Figure 3A:
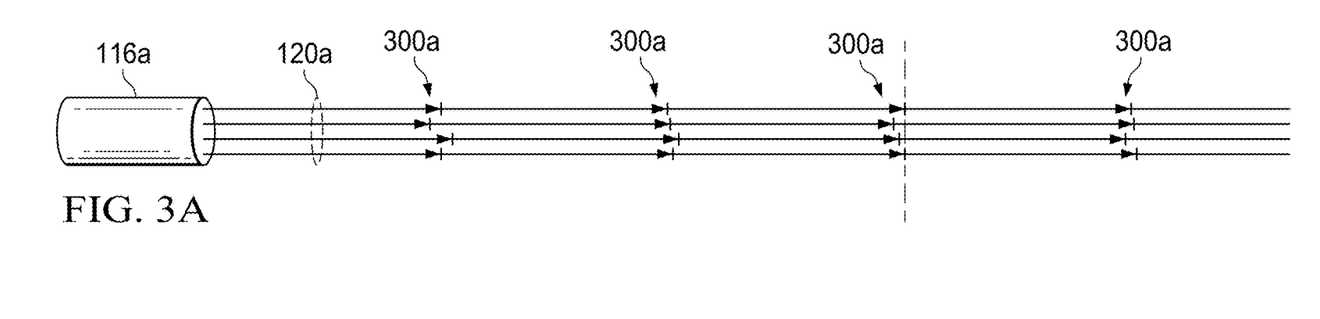
FIGS. 3A, 3B, and 3C illustrate example time delays in multiple optical signals emitted from the transmitter showing correspondence to phase transitions between symbols in accordance with this disclosure.
Figure 3B:
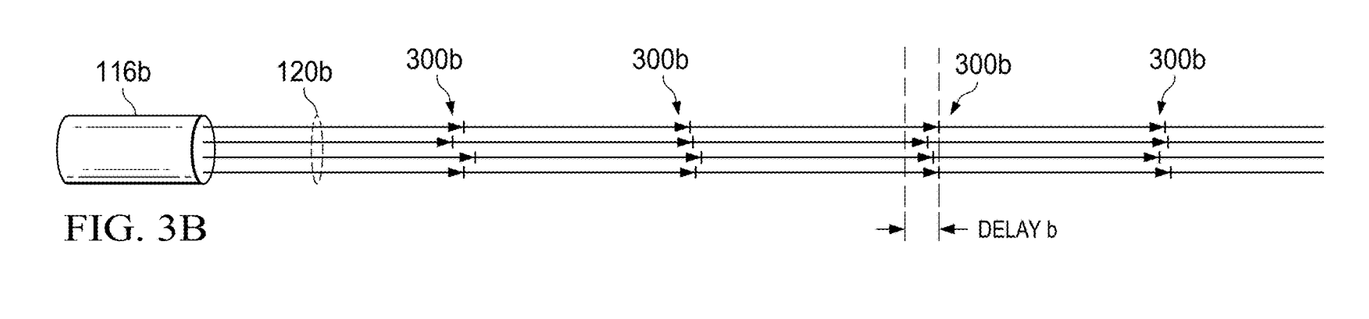
Figure 3C:
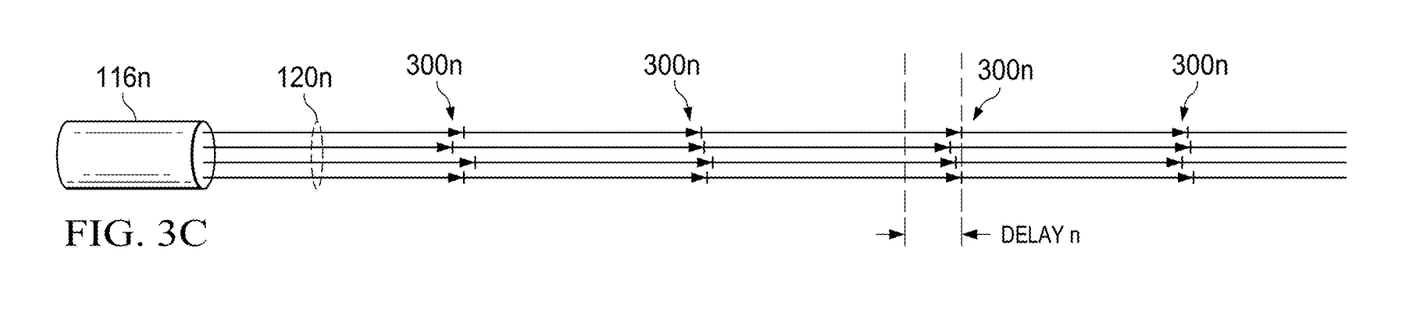

FIGS. 3A, 3B, and 3C illustrate example time delays in multiple optical signals (such as signals 120a-120n) emitted from the transmitter 100, 100a, 100b that correspond to phase transitions between symbols in accordance with this disclosure. In particular, FIGS. 3A, 3B and 3C illustrate an example propagation of coherent light from the optical transmitter through a realistic medium (such as air), where the light may encounter aberrations (such as air perturbations). The light rays are influenced by air perturbations or other obstructive influences that may affect a portion of each of the signals 120a, 120b, 120n differently than adjacent portions within each of the signals. As a result, wavefronts 300a, 300b, 300n for the signals 120a, 120b, 120n may become misaligned as illustrated.

As will be understood, the labeling of the wavefronts 300a, 300b, 300n in FIGS. 3A, 3B and 3C is arbitrary. Any position in space and/or time of an optical signal may be identified as a wavefront for purposes of discussing wavefront or phase alignment with respect to other space-time positions. The phase relationship or coherency of a bundle of light rays at one position in space-time may change as the bundle of light rays propagates and is influenced by the medium through which it travels. Also, alterations in phase relationship experienced by a particular bundle of light rays may not be the same as that experienced by another bundle of light rays that come before or after. Therefore, the alignment or misalignment of arriving wavefronts may change significantly from one moment to the next, as illustrated by the varying alignment shown for each wavefront 300a, 300b, 300n illustrated.

When information carried by the optical signals 120a, 120b, 120n is contained in the phase of the signals, a conventional optical receiver that would focus and concentrate the optical signals 120a, 120b, 120n (such as an optic lens system) would produce focused light that is not coherent and no longer carries the phase information. To be able to retrieve the information, a conventional optical receiver typically requires some form of wavefront correction to restore the phase relationship across the wavefronts 300a, 300b, 300n of the signals 120a, 120b, 120n. In contrast, the optical receiver 150 described here is not affected by these perturbations (delays on the order of less than a wavelength).

Even if a conventional receiver employs a wavefront correction mechanism, it cannot retrieve the carried information if the three signals 120a, 120b, 120n are highly incoherent due to different time delays incorporated into the signals 120a, 120b and 120n by either of the phase or time delay circuits 114a, 114b, whichever method or structure may implemented. This is also illustrated in FIGS. 3A, 3B and 3C. For illustrative purposes only, in this explanation, assume that each wavefront is shown corresponding to a phase change in the light beams (phase transition between symbols). The distance between each of the wavefronts 300a can represent a symbol length (or modulation rate) within the signal 120a. Similarly, the distances between each of the wavefronts 300b and between each of the wavefronts 300n can also represent the symbol length within the signals 120b and 120n, respectively.

An example of time or delay shifts of the wavefronts 300b and 300n with respect to the wavefronts 300a are illustrated here. As will be appreciated, to obtain these shifts or delays, the delay element 140a may cause a delay (Delay a) equal to zero (no delay is injected), the delay element 140b may cause a delay equal to an amount Delay b, and the delay element 140n may cause a delay equal to an amount Delay n. In one specific example, the Delay b may equal about 10% of the symbol length, while Delay n may equal to about 20% of the symbol length, and Delay a is equal to zero. Such delays are typically on the order of hundreds and possibly thousands of wavelengths of the lasers but are on the order of 0% to around 30% of the symbol length. In other words, multiple intensity-modulated beams with optically-large phase distortions (hundreds to thousands of wavelengths) that correspond to electrically-small phase delays (such as 30% or less of symbol length) can be overlaid in a etalon-based receiver without significant loss and the transmitted information can be recovered.

In some embodiments, the predetermined delay amount is an amount less than about 30% of a symbol length of symbols transmitted within the second optical beam 120b. In other embodiments, the predetermined delay amount is an amount between about 5% and 20% of the symbol length and greater than 100 wavelengths of the wavelength of the second optical beam 120b.

By deliberating shifting/delaying either one or more of the control signals 115a-115n with respect to each other (electric path delaying) and/or one or more of the modulated beams after output from the modulators (optical path delaying), the modulated output signals 120a-120n are incoherent, which renders the signals virtually undetectable by conventional receivers (when operating in hard-to-intercept mode). By refraining from using any delays, the output signals 120a-120n will be relatively coherent (aside from wavefront variations resulting from propagation through air, etc.) and may be detectable by a conventional receiver (when operating in conventional mode).

FIGS. 3A, 3B, and 3C illustrate examples of time delays in multiple optical signals emitted from multiple lasers where the wavefronts correspond to changes in phase of the light from one symbol segment to another symbol segment. This results in detectable transitions between symbols. Various changes may be made to FIGS. 3A, 3B, and 3C. For example, the wavefronts 300a, 300b, 300n here are examples only, and the actual wavefronts obtained during use can vary widely based on a number of factors.

As will be appreciated, the optical transmitters 100a, 100b can be actively controlled to switch from one mode to the other mode as desired. For example, the respective control circuit 210a, 210b may include a controller or other logic circuitry for controlling activation of the modes (and the associated amount of each channel delay) based on user input or programming.

Although some examples illustrated and described above are directed to injecting fixed electrical or optical path delays, other embodiments may utilize programmable or variable time delays, such as any other signal, pseudorandom modulation, or other signals/timing that provide varying delays over time and per signal. This may result in increased incoherency and therefore increased difficulty in detecting the modulated optical signals 120a-120n on one hand, and may allow for increasing coherency by proper adjustment of the encoded data signals and delays on the other hand. In other words, the optical transmitters 100a, 100b may be configurable to inject large phase/time delays in the optical signals 120a-120n to achieve non-detectability while also having the ability to configure the optical signals 120a-120n to appear conventional (no delays) and be detectable by a conventional receiver.

Figure 4:
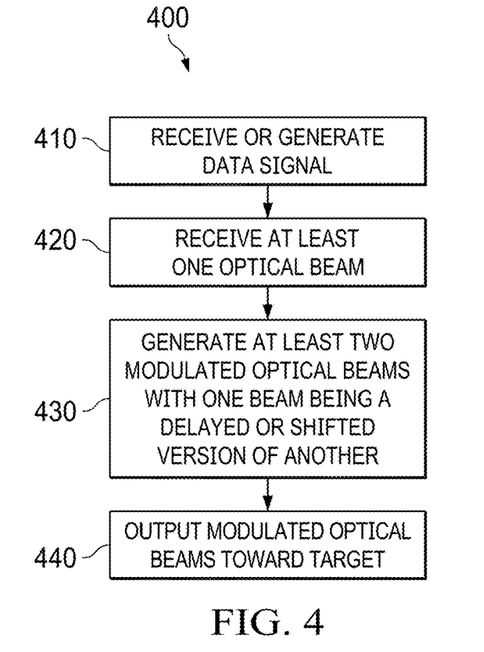
FIGS. 4 and 5 illustrate methods of transmitting and receiving, respectively, optical signals in accordance with this disclosure.
Figure 5:
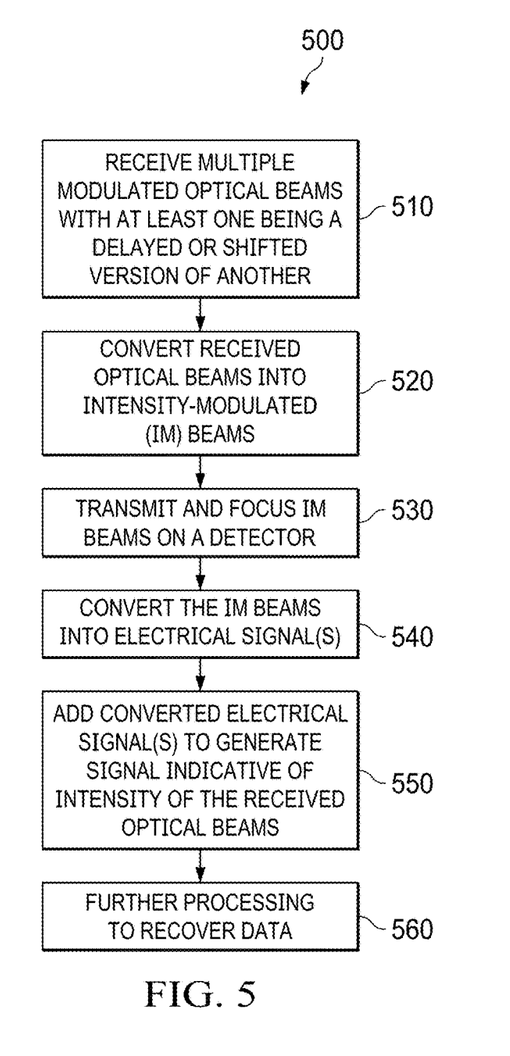

Now referring to FIGS. 4 and 5, there are illustrated a method (400) of transmitting optical signals and a method (500) of receiving optical signals in accordance with this disclosure and teachings.

On the transmit end, data within an input signal (or data signal) 110 is generated or received (step 410). A delay and modulation circuit 125 receives at least one optical beam. (step 420). The delay and modulation circuit also receives the data signal 110 and generates at least two modulated optical beams 120a-120n (using the at least one optical beam) each having the data encoded therein (step 430). As described above, any suitable type of phase modulation or encoding (including phase modulation combined with amplitude or frequency modulation) may be utilized. One of the modulated optical beams is delayed with respect another by a delay amount. In other words, the encoded data (e.g., symbols) of one modulated optical beam is delayed in time or phase with respect the same encoded data of the other modulated optical beam. The amount(s) of delay(s) may be less than a length of the symbols transmitted on the optical beams 120a-120n and, in some embodiments, is an amount less than about 30% of a symbol length (and in some cases between about 5% and 25% of the symbol length) and greater than 100 wavelengths of the laser wavelength. The resulting modulated optical beams 120a-120n (with one or more delays) are emitted and directed to a target (step 450).

To create the delayed version, two identical encoding signals may be generated, and the delay is injected into the electrical path of one prior to input to the modulators. These original and delayed versions are applied to control the modulator to generate undelayed and delayed modulated optical beams 120a-120n. In another embodiment, the delay may be injected in the optical path of one optical beam after the optical beams have been modulated by the same encoding signal.

On the receive end, an etalon-based optical receiver 150 receives the modulated optical beams 120a-120n with at least one beam being a delayed or shifted version of another beam (step 510). As will be appreciated, the transmitter and method used to generate these received modulated optical beams 120a-120 may be irrelevant to the receive end, as long as one constitutes a delayed or shifted version of another as described or contemplated herein. One or more etalons convert or demodulate the received optical beams 120a-120n into intensity-modulated (IM) beam energy 165a-165n (step 520). The IM beam energy 165a-165n is transmitted and focused via optics 170 on and received by one or more detectors 180, such as one or more photodiodes or array of photodiodes (step 530). The detector also converts the received optical energy into electrical signal(s) 185 (step 540). Since most, if not virtually all, of the optical energy from each of the optical beams 120a-120n is received at the detector 180, the detector 180 is configured to provide an additive function to add the converted electrical signal(s) together (or generates individual signals that can be added together) to generate a signal indicative of the intensity of the received optical beams (step 550). The converted electrical signal 185 can then be further processed to determine or otherwise recover the data represented by the detected phase changes in the optical beams 120a-120n (step 560).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An optical transmitter comprising:
an optical laser source configured to output at least one optical beam; and
a communications circuit configured to:
receive first data,
receive the at least one optical beam,
transmit, using the at least one optical beam, a first modulated optical beam encoded with the first data in accordance with a predetermined phase modulation scheme, and
transmit, using the at least one optical beam, a second modulated optical beam encoded with the first data in accordance with the predetermined phase modulation scheme;
wherein the second modulated optical beam is a time-delayed version of the first modulated optical beam; and
wherein the communications circuit is configured to apply a delay that renders the second modulated optical beam incoherent with the first modulated optical beam at a receiver.

2. The optical transmitter of claim 1, wherein the optical laser source comprises a first laser source configured to output a first optical beam and a second laser source configured to output a second optical beam simultaneously with the first optical beam.

3. The optical transmitter of claim 2, wherein the communications circuit comprises:
a modulator configured to receive the first optical beam and the second optical beam and generate the first modulated optical beam and the second modulated optical beam; and
a delay element configured to generate the delay in the second modulated optical beam in relation to the first modulated optical beam.

4. The optical transmitter of claim 3, wherein the delay element is disposed within an optical path associated with the second modulated optical beam.

5. The optical transmitter of claim 3, wherein the delay element is disposed within an electrical signal path associated with the second modulated optical beam.

6. The optical transmitter of claim 3, further comprising:
a control circuit configured to vary the delay in the second modulated optical beam.

7. The optical transmitter of claim 1, wherein the delay is an amount that is less than a symbol length of symbols transmitted within the second modulated optical beam.

8. The optical transmitter of claim 7, wherein the delay is an amount of time that is less than about 30% of the symbol length and greater than a time equivalent of 100 wavelengths of transmission for the second modulated optical beam.

9. The optical transmitter of claim 1, wherein the delay is an amount of time greater than a time equivalent of 50 wavelengths of transmission for the second modulated optical beam.

10. The optical transmitter of claim 1, wherein the communications circuit is further configured to generate, using the at least one optical beam, a third modulated optical beam encoded with the first data in accordance with the predetermined phase modulation scheme, wherein the third modulated optical beam is another time-delayed version of the first modulated optical beam.

11. A method of transmitting optical signals, the method comprising:
receiving first data;
receiving at least one optical beam;
transmitting, using the at least one optical beam, a first modulated optical beam encoded with the first data in accordance with a predetermined phase modulation scheme; and
transmitting, using the at least one optical beam, a second modulated optical beam encoded with the first data in accordance with the predetermined phase modulation scheme;
wherein the second modulated optical beam is a time-delayed version of the first modulated optical beam; and
wherein the second modulated optical beam is delayed by a transmitter so as to be incoherent with the first modulated optical beam at a receiver.

12. The method of claim 11, wherein receiving the at least one optical beam comprises:
receiving a first optical beam from a first laser source; and
receiving a second optical beam from a second laser source simultaneously with receiving the first optical beam.

13. The method of claim 12, further comprising:
modulating the first optical beam to generate the first modulated optical beam;
modulating the second optical beam to generate the second modulated optical beam; and
generating the delay that causes the second modulated optical beam to be the time-delayed version of the first modulated optical beam.

14. The method of claim 13, wherein generating the delay comprises:
generating the delay within an optical path associated with the second modulated optical beam.

15. The method of claim 13, wherein generating the delay comprises:
generating the delay within an electrical signal path associated with the second modulated optical beam.

16. The method of claim 11, wherein the delay is an amount that is less than a symbol length of symbols transmitted within the second modulated optical beam.

17. The method of claim 16, wherein the delay is an amount that is less than about 30% of the symbol length and greater than a time equivalent of 100 wavelengths of transmission for the second modulated optical beam.

18. A method of receiving optical signals, the method comprising:
receiving, at an etalon-based optical receiver, a first optical beam modulated according to a specified signal, the first optical beam carrying data and comprising phase modulations;
receiving, at the etalon-based optical receiver, a second optical beam modulated according to the specified signal, the second optical beam carrying the data and comprising phase modulations, wherein the received second optical beam is a time-delayed version of the received first optical beam;
converting the received first optical beam into a first intensity-modulated (IM) beam;
converting the received second optical beam into a second IM beam, wherein the first IM beam and the second IM beam are incoherent;
receiving, at a detector, the first IM beam and the second IM beam; and
generating and outputting an electrical signal having a magnitude indicative of intensity of the first IM beam and the second IM beam;

wherein the received second optical beam is time-delayed by a delay amount that is greater than a time equivalent of 100 wavelengths of transmission for the received second optical beam.

19. The method of claim 18, wherein the delay amount is less than about 30% of a modulation rate of the received second optical beam.

20. The method of claim 18, further comprising:
receiving, at the etalon-based optical receiver, a third optical beam modulated according to the specified signal, the third optical beam carrying the data and comprising phase modulations, wherein the received third optical beam is another time-delayed version of the received first optical beam;
converting the received third optical beam into a third IM beam; and
receiving, at the detector, the third IM beam; and
wherein generating and outputting the electrical signal having the magnitude indicative of the intensity of the first IM beam and the second IM beam comprises:
generating and outputting the electrical signal having a magnitude indicative of intensity of the first IM beam, the second IM beam, and the third IM beam.

* * * * *